United States Patent
Kawanishi

(10) Patent No.: US 6,600,588 B2
(45) Date of Patent: *Jul. 29, 2003

(54) RECIPROCATING OPTICAL MODULATION SYSTEM

(75) Inventor: Tetsuya Kawanishi, Tokyo (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/820,664

(22) Filed: Mar. 30, 2001

(65) Prior Publication Data

US 2001/0055141 A1 Dec. 27, 2001

(30) Foreign Application Priority Data

Jun. 22, 2000 (JP) .......................... 2000-188507

(51) Int. Cl.[7] .............................. G02F 1/03; G02F 1/07; G02F 1/01; G02B 26/00
(52) U.S. Cl. ...................................... 359/246; 359/238
(58) Field of Search ................................ 359/246, 238, 359/181, 309, 249, 239, 237, 245, 247, 251, 254, 261, 267, 276, 278, 279, 284, 300, 302, 308, 317, 318

(56) References Cited

U.S. PATENT DOCUMENTS 4,588,296 A * 5/1986 Cahill et al. ................ 356/350
5,917,179 A * 6/1999 Yao ........................... 250/227

OTHER PUBLICATIONS

Sasaki, et al., "60 GHz Band Resonance Type LiNbO$_3$ Optical Modulator" 2000 General Meeting of the Institute of Electronics, Information and Communication Engineers, p. 279.

T. Kobayashi, "Generation of Ultrashort Optical Pulses Using Domain–Inverted External Phase Modulator" Oyo Buturi, vol. 67, No. 9, pp. 1056–1060, 1998.

A. Inoue, "Progress of Fiber Grating Technology", 2000 General Meeting of the Institute of Electronics, Information and Communication Engineering, pp. 246–247.

S. Shimotsu, et al., "Subcarrier Generation with Integrated Four Balanced LN PH LiNbO$_3$ Phase Modulators", 2000 General Meeting of the Institute of Electronics, Information and Communication Engineers, p. 199.

* cited by examiner

Primary Examiner—Hung Xuan Dang
Assistant Examiner—Joseph Martinez
(74) Attorney, Agent, or Firm—Oblon, Spivak, McClelland, Maier & Neustadt, P.C.

(57) ABSTRACT

A, reciprocating optical modulation system includes a device that modulates light of a predetermined frequency by an integer multiple n to produce a group of nth order sidebands thereof; a device that modulates the nth order sidebands to produce (n+1)th order sidebands; and a device that selects at least part of the (n+1)th order sidebands.

24 Claims, 6 Drawing Sheets

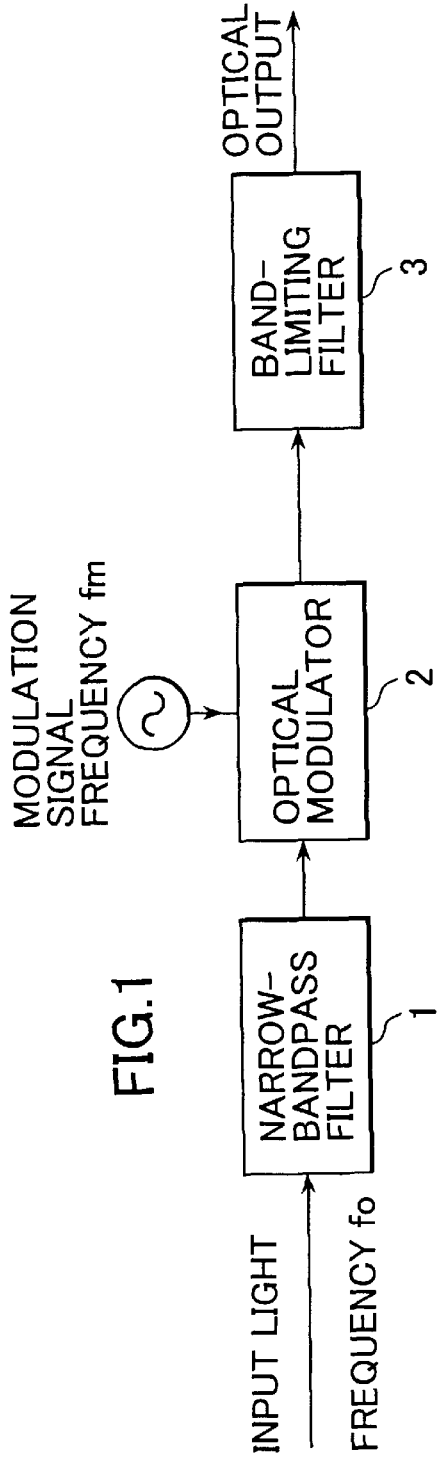
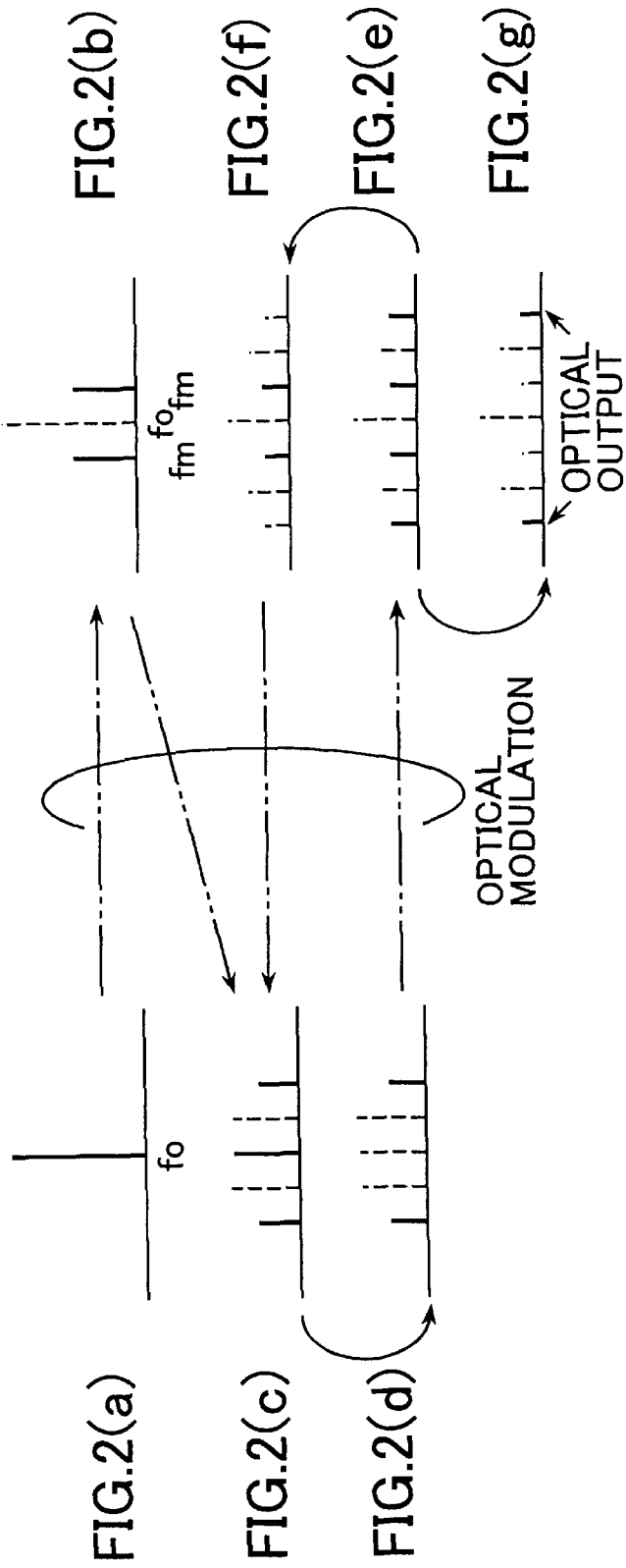
FIG.1
FIG.2(a)
FIG.2(b)
FIG.2(c)
FIG.2(d)
FIG.2(e)
FIG.2(f)
FIG.2(g)

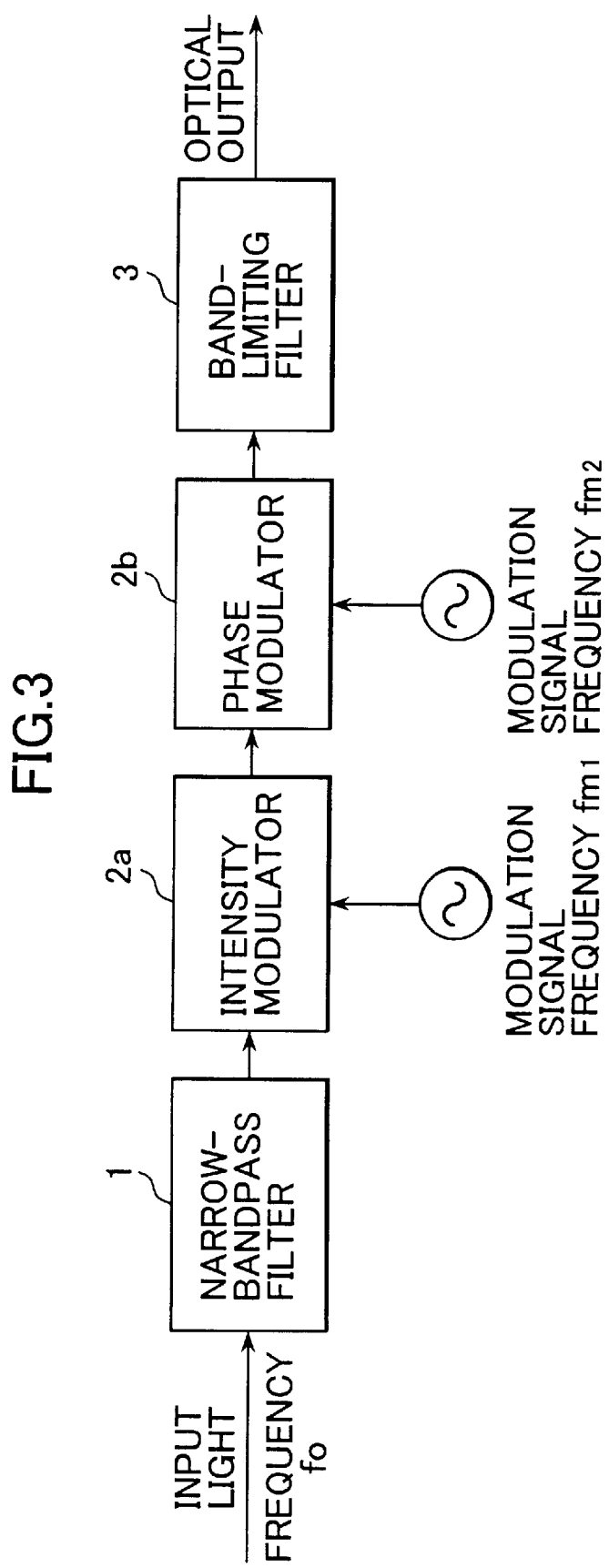

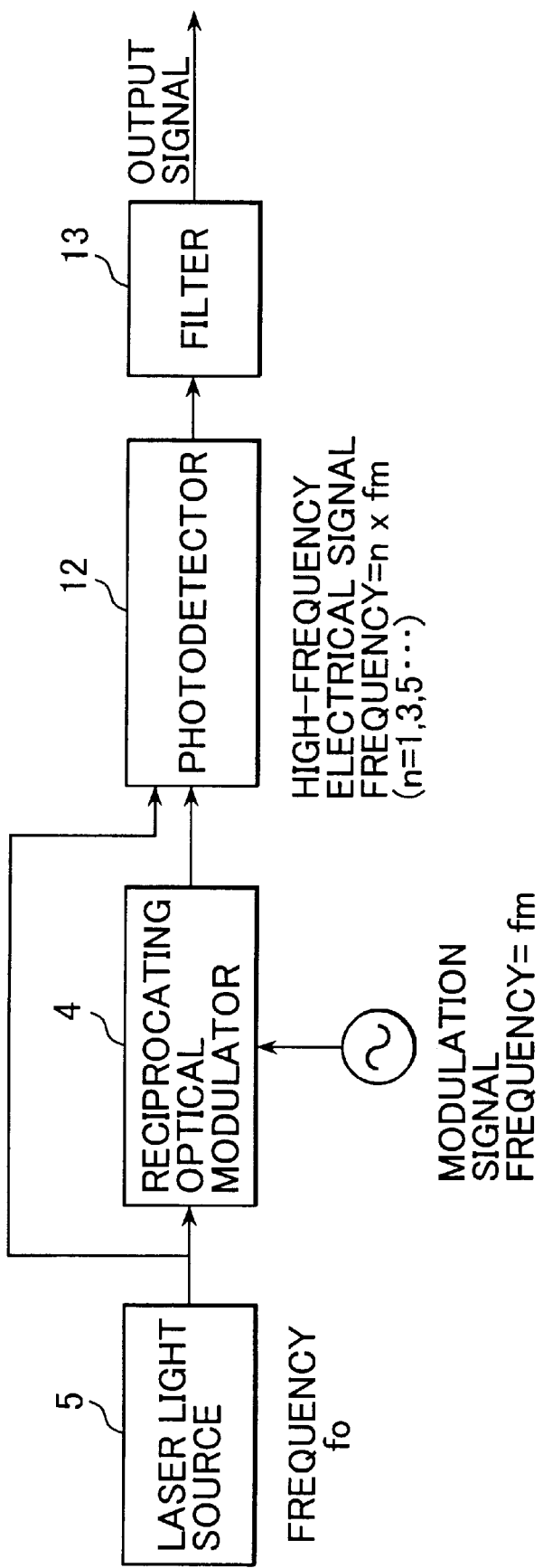

RECIPROCATING OPTICAL MODULATION SYSTEM

BACKGROUND OF THE INVENTION

1. Field of the Invention

The present invention relates to a system that uses high-frequency signals to modulate optical signals, and particularly to a reciprocating optical modulation system that can generate an optical signal having a frequency that is a number of times higher than that of the applied electrical signal.

2. Description of the Prior Art

Optical modulation by high-frequency signals is generally accomplished by inputting an optical carrier wave and a high-frequency electrical signal to an optical modulator and performing intensity modulation or phase modulation or other such modulation. In the case of this method, in order to obtain a sideband having a frequency that is at least as high as that of the applied high-frequency electrical signal, the high-frequency electrical signal is multiplied to form an even higher-frequency signal that is used for the optical modulation. However, even when the high-frequency electrical signal is thus multiplied, the maximum modulation frequency is determined by the upper limit of the electrical signal. Thus, in terms of frequency, an electrical signal that is multiplied or amplified or other such signal is limited by the maximum characteristic of the electrical circuit. There is therefore a need to overcome this drawback.

There have been reports of attempts to produce a sideband with a frequency higher than that of the applied high-frequency signal, using phase modulation with a high modulation index. One reference ("Generation of Ultrashort Optical Pulses Using Domain-Inverted External Phase Modulator," by T. Kobayashi, OYO BUTURI, vol. 67 No. 9 (1998), pp. 1056–1060) describes applying a 16.26 GHz electrical signal to an optical modulator having a waveguide formed of an electro-optical crystal of $LiTaO_3$ on which a stripline resonator was disposed. With a modulation index set at 87 radial, the spectral bandwidth was around 2.9 THz.

However, with the above type of phase-modulation configuration that uses a high modulation index, in order to increase the amplitude of the high-frequency electrical signal so as to obtain the high modulation index, a stripline resonator is used as the modulator electrodes, making it difficult to change the modulation frequency. Although it is easy to think of a configuration in which using a resonator as the modulator electrodes can be avoided by amplifying the electrical signal, thereby making it possible to readily change the modulation frequency, it is well known that the amplifier would place an upper limit on the high-frequency electrical signal.

In view of the above, an object of the present invention is to provide a reciprocating optical modulation system that can readily generate high-order sidebands even with a high-frequency electrical signal having a smaller amplitude than that of the prior art phase modulation configuration described above that uses high modulation-index setting.

SUMMARY OF THE INVENTION

To attain the above object, the present invention provides a reciprocating optical modulation system, the system comprising: means that, taking n as a predetermined integer of 1 or more, modulates light of a predetermined frequency to produce an nth order sideband group thereof; means that modulates the nth order sideband group to produce an (n+1)th order sideband group; and means that selects at least part of the (n+1)th order sideband group. Here, "(n+1)th order sideband" refers to a sideband (n+1)-times the modulation frequency that is frequency-separated from the carrier wave, and the "(n+1)th order sideband group" refers to two sidebands located symmetrically with respect to the carrier wave.

The reciprocating optical modulation system of the present invention also includes a light path that is shortened by being folded by a reflection means. The system also includes a plurality of modulation means, to which at least one of sideband groups of a different order is input, a configuration that can reduce the cost of the system by decreasing the number of modulators used.

The present invention also provides a reciprocating optical modulation system comprising first reflection means that prior to modulation passes light of the predetermined frequency and reflects light of other frequencies; and second reflection means that with respect to the predetermined integer n of 1 or more, passes (n+1)th sidebands and reflects other light. One example of the system configuration comprises a laser light source, the first reflection means comprised of a narrow-bandpass filter, an optical modulator, and the second reflection means comprised of a band-limiting filter. This reciprocating optical modulation system can further includes a laser light source and an optical modulator, wherein the first reflection means is comprised of a narrow-bandpass filter, and the second reflection means is comprised of a band-limiting filter. The reciprocating optical modulation system can further includes a phase modulator, wherein the first reflection means is comprised of a narrow-bandpass filter, and the second reflection means is comprised of a band-limiting filter.

The invention also provides a reciprocating optical modulation system that further includes means for converting part of the optical output into electrical signals, and means for re-inputting the electrical signals to the modulation signal of the phase modulator. In another example, the system also includes means that uses a nonlinear element for combining a portion of the light input to the system with sideband output from the system, and means for extracting from the mimed signals electrical signals of a predetermined frequency band.

Further features of the invention, its nature and various advantages will be more apparent from the accompanying drawings and following detailed description of the invention.

BRIEF DESCRIPTION OF THE DRAWINGS

FIG. 1 is a block diagram of the basic configuration of a reciprocating optical modulation system of the present invention.

FIGS. 2(a) to 2(g) are drawings for explaining what happens up until light of frequency of is modulated and the third order sideband signal is output.

FIG. 3 is a block diagram showing a variation in the basic system configuration shown in FIG. 1.

FIG. 7 is a block diagram of a third embodiment of the reciprocating optical modulation system of the invention.

DESCRIPTION OF THE PREFERRED EMBODIMENT

The invention will now be described with reference to the accompanying drawings. In FIG. 1, the light that is input has a frequency $f_0$. A narrow-bandpass filter 1 passes this input light of frequency $f_0$, but reflects light having a frequency that deviates even slightly from that frequency. The narrow-bandpass filter 1 is therefore used as a reflection means. An intensity modulator 2 can modulate left or right oriented light with a modulation frequency fm. A band-limiting filter 3 reflects light of up to n order sideband frequency, for example up to third order, and passes other light. Therefore, the band-limiting filter 3, too, is used as a reflection means.

With the configuration described above, light of frequency $f_0$ that is input after passing through the narrow-bandpass filter 1 is modulated, resulting in the sideband of FIG. 2(b). For simplicity, it is assumed that the modulation is linear and that only first-order sidebands are generated on each side. In FIG. 2, solid lines are used to denote sidebands generated by modulation, while dotted lines denote the wavelength position of the light prior to the modulation. The band-limiting filter 3 reflects the modulated light back through the intensity modulator 2. This subjects the sidebands to modulation, creating the spectrum of FIG. 2(c). The carrier wave portion of the light passes through the narrow-bandpass filter 1, leaving just the sideband depicted in FIG. 2(d), which is reflected and further modulated, resulting in the spectrum of FIG. 2(e). Thus, this modulation process produces first-order and third-order sidebands. The third-order sideband, shown in FIG. 2(g), passes through the band-limiting filter 3, while the first-order sideband shown in FIG. 2(f) is reflected thereby. In this way, the third-order sideband is output from the band-limiting filter 3.

The above description has been made with reference to the intensity modulator 2. However, the same effect is also obtained with a phase modulator. Modulators that can be used for the purposes of the present invention include resonance type modulators and traveling wave type modulators. A traveling wave modulator has electrodes at both ends, meaning that a modulation signal can be input from either end, enabling the same modulation to be imparted to the light whichever way the light is traveling.

FIG. 3 is a block diagram showing a variation of the system configuration shown in FIG. 1. Specifically, a phase modulator 2b has been added to the system of FIG. 1. The optical output can be intensity-modulated by supplying the phase modulator 2b with an additional modulation signal. The phase modulator 2b can be made to perform amplitude modulation by a change in the interference conditions effected by changing the phase of the light reflected in an optical resonator comprising the narrow-bandpass filter 1 and the band-limiting filter 3.

Figure 4:
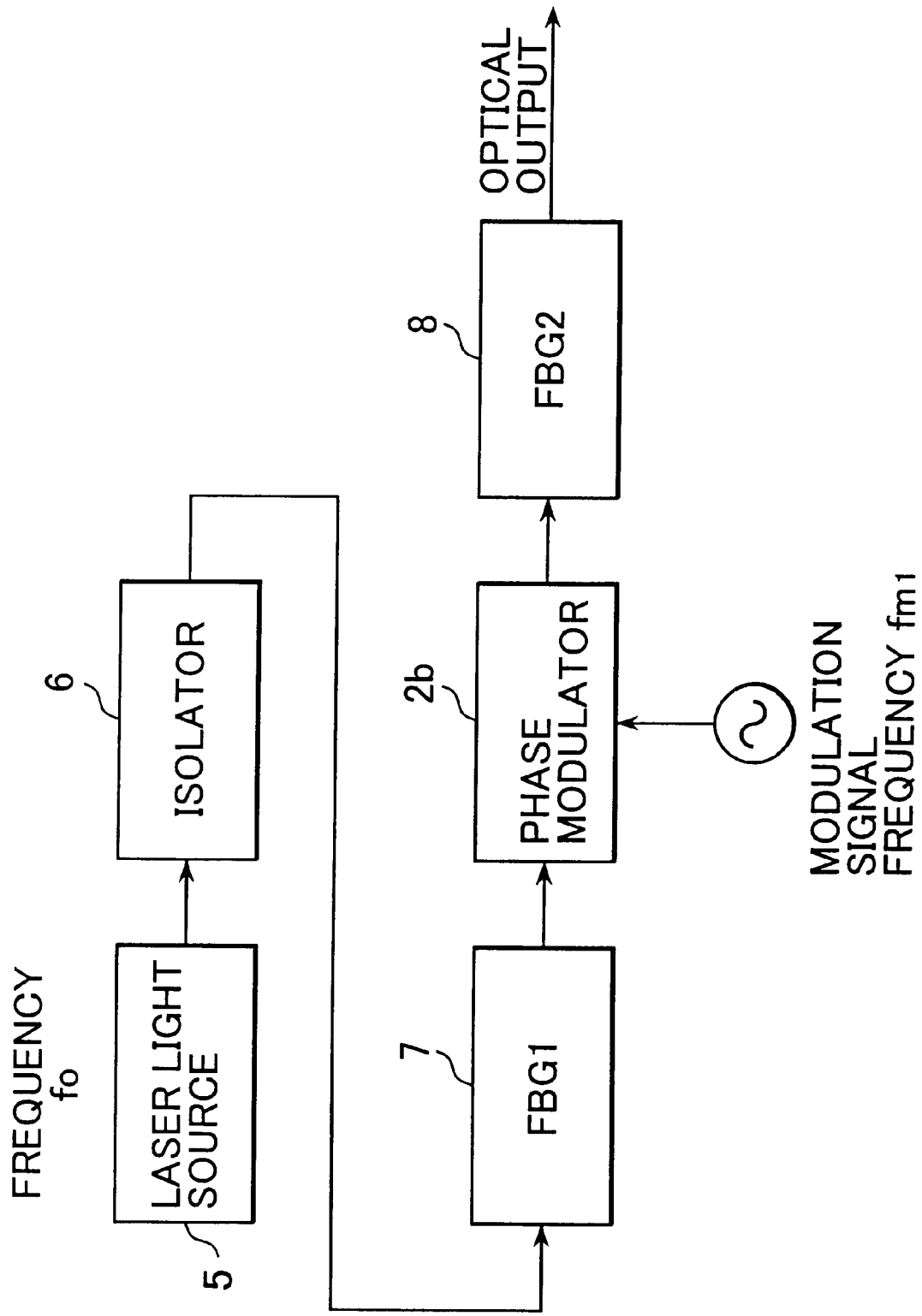
FIG. 4 is a block diagram of a modulator system used to verify the principle of the present invention.

FIG. 4 is a block diagram of a modulation system configuration used to verify the principle of the present invention. Reflection by a fiber grating (FBG) 7 and a fiber grating (FBG) 8 causes the light input to be passed through the phase modulator 2b a plurality of times, generating a high-order sideband. A laser light source 5 is a 10-milliwatt semiconductor laser that operates at a wavelength of 1550 nanometers. An isolator 6 is of a commercially available type manufactured by Newport Company. The fiber gratings 7 and 8 are also of a commercially available type, made by M Company. This type of the fiber gratings is described, for example, in "Trends in the Development of Fiber Grating Technology," by S. Inoue, C-3-67, 2000 General Meeting of The Institute of Electronics, Information and Communication Engineers, pp. 245–247. The modulator 2b is a commercially available traveling wave type phase modulator manufactured by Sumitomo Osaka Cement Co., Ltd., that can handle high-frequency electrical signal inputs having a frequency of up to 40 Ghz. With a modulation system thus configured, it was possible to obtain a −32 dBm sideband with a carrier frequency separation of 210 Ghz, from the input of a 30 Ghz, 27.8 dBm modulation signal.

Figure 5:
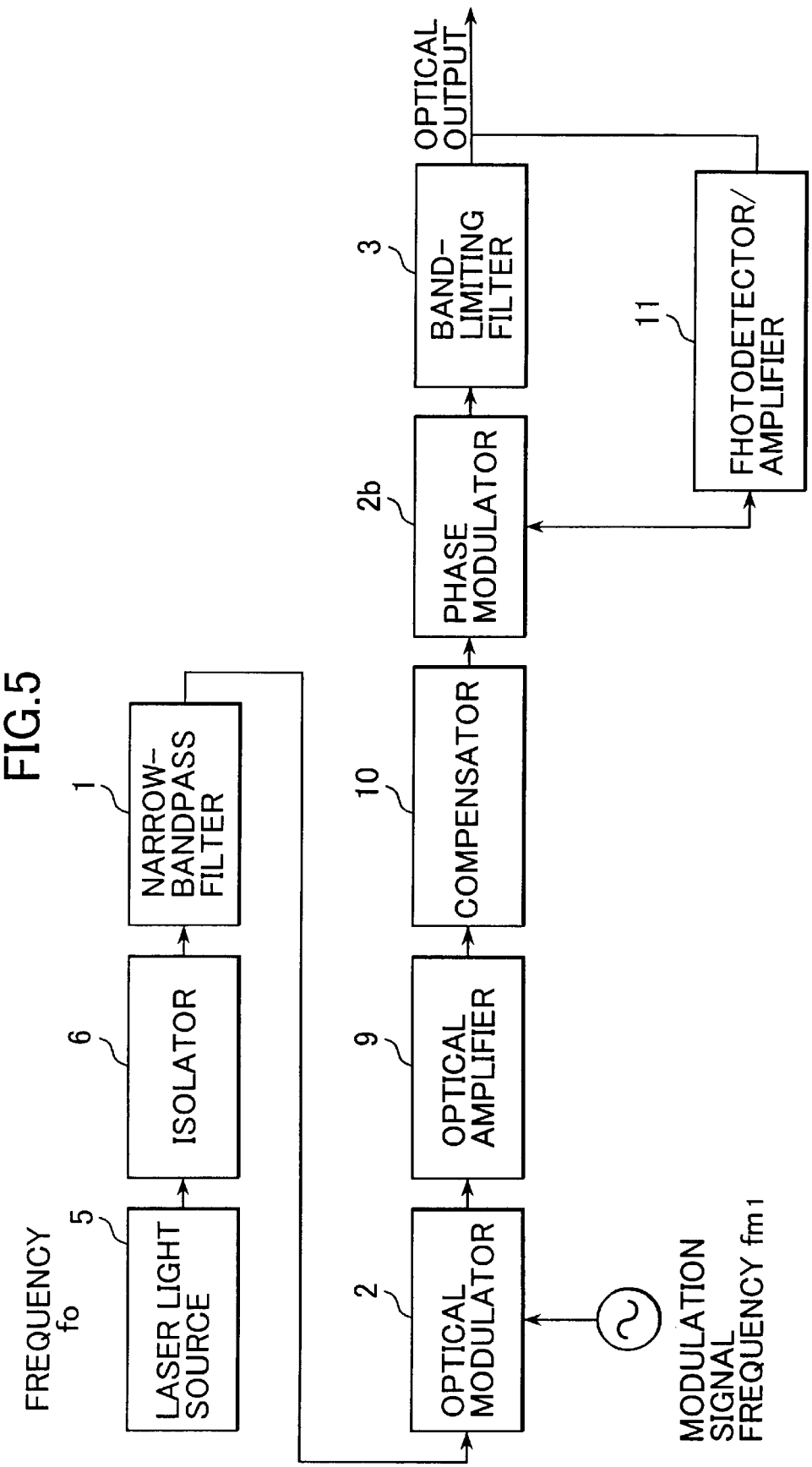
FIG. 5 is a block diagram of a first embodiment of the reciprocating optical modulation system of the invention.

FIG. 5 shows the arrangement of a first embodiment of the modulation system of the present invention. This modulation system is provided with an isolator 6 to suppress the effect of light returning back from the narrow-bandpass filter 1, a dispersion compensator 10 for preventing the efficiency of the reciprocating modulation from decreasing even at high-order sideband frequencies, and an optical amplifier 9 for obtaining a high output The compensator 10 compensates for dispersion arising in the other components. It is possible to dispense with the compensator 10 by equipping the other system components with this function.

The intensity of the optical output generally fluctuates. However, the output can be kept stable by, for example, using a photodiode in a photodetector/amplifier 11 to convert the optical output to an electrical signal that is fed back to the phase modulator 2b. This is because the fluctuations in the intensity of the optical output are caused by variations in the phase of the light arising from variations in the light path. Instead of the phase modulator 2b, a modulator can be used that attenuates the carrier wave, leaving both sidebands, such as the modulator described in "Optical Subcarrier Generation Using Integrated LN Phase Modulator," by Shimozu, et al., C-3-20, 2000 General Meeting of The Institute of Electronics, Information and Communication Engineers, p. 199. A semiconductor-bused absorption modulator, a Mach-Zehender interference type intensity modulator or an electro-optic-effect phase modulator can be used for the modulator 2.

Modulation index can be readily improved by using resonance type intensity and phase modulators that perform the modulation by using electrodes that resonate at the modulation frequency. As can be readily understood, this means that sufficient modulation can be obtained using, just a small amount of high-frequency power. The properties of a resonance type modulator are described in "60 GHz Band Resonance Type LiNbO$_3$ Optical Modulator," by Sasaki, et al., C-3-125, 2000 General Meeting of The Institute of Electronics, Information and Communication Engineers, p. 279.

In the above-described modulator, as long as the optical amplifier 9 is between the narrow-bandpass filter 1 and the band-limiting filter 3, the precise position has no particular significance. Similarly, there is no particular significance attached to the order in which the modulator 2, optical amplifier 9, compensator 10 and phase modulator 2b are arranged, because the same effect is obtainable even if a different order is used.

As mentioned above, supplying another modulation signal to the phase modulator 2b enables intensity-modulation of the optical output. As has also been described above, while the intensity of the optical output generally fluctuates, it can be kept stable by, for example, using a photodiode in the photodetector/amplifier 11 to convert the optical output to an electrical signal that is used as feedback to the phase modulator.

Figure 6:
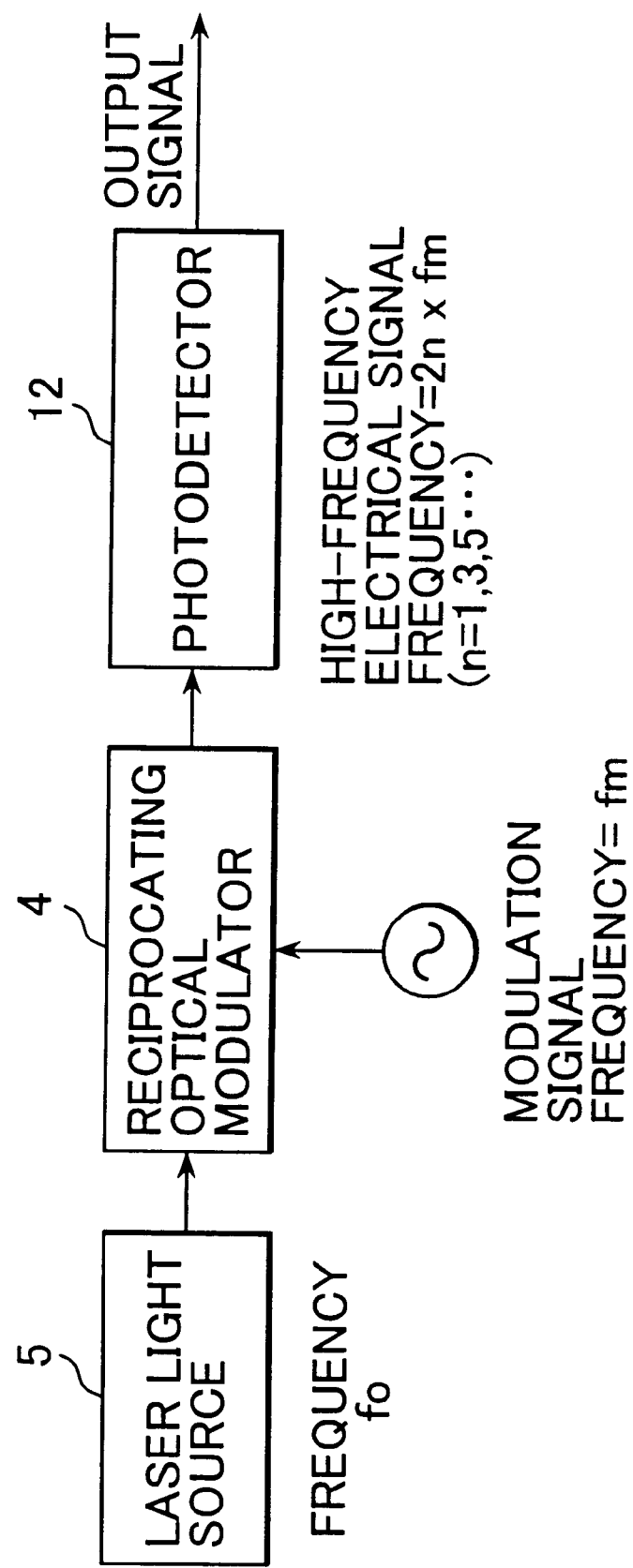
FIG. 6 is a block diagram of a second embodiment of the reciprocating optical modulation system of the invention.

Neat, an example of harmonic generation using the reciprocating optical modulation system of the present invention will be described. FIG. 6 is a simplified representation of a second embodiment of the modulation system of the invention. In FIG. 6, light emitted by a laser light source 5 is modulated by a reciprocating optical modulator 4, which has optical filter properties, producing double sidebands having frequencies equivalent to n times the modulation frequency fm (where n is a predetermined positive integer 1, 3, 5 . . . ), which are applied to a photodetector 12. The photodetector 12 is a nonlinear element, and the result of this nonlinearity is an electrical signal slaving a frequency that is n times the frequency differential of the two sidebands, i.e. 2×fm.

FIG. 7 shows a simplified representation of a third embodiment of the modulation system of this invention. With respect to FIG. 7, light from a laser light source 5 is modulated by a reciprocating optical modulator 4, which has optical filter properties, producing a sideband having a frequency equivalent to n times the modulation frequency (where n is a predetermined positive integer 1, 3, 5 . . . ). This sideband signal and light from the laser light source 5 are applied to a photodetector 12. Owing to the nonlinear effect of the photodetector 12, this gives rise to an electrical signal having a frequency that is the frequency differential between the sideband and the light from the laser light source 5. A filter 13 is used to select a signal of a predetermined frequency. Again, it can readily be understood that there is no need to provide a light path to apply the light from the source 5 to the photodetector 12 in case there is a leakage of light from the source 5 that has passed through a modulator 4.

Below is described the effectiveness of the system of the present invention having the configuration explained in the foregoing. The modulation system of the present invention comprises means that, taking u as a predetermined integer of 1 or more, modulates light of a predetermined frequency to produce a group of nth order sidebands thereof; means for modulating the nth order sideband group to produce an (n+1)th order sideband group; and means for selecting at least part of the (n+1)th order sideband group. By thus easing constraints with respect to electrical circuit performance, this makes it possible to obtain high-order sidebands in a planned way.

The system also includes a configuration in which reflection means are used to fold the light path, marina it possible to configure the system with a short light path. The system also includes a configuration with a plurality of modulation means, at least one of which receives the input of a group of sidebands of different orders, which makes it possible to reduce the manufacturing cost by decreasing the number of modulators used.

In another configuration, the modulation system includes first and second reflection means, with the first reflection means transmitting pre-modulation light of the predetermined frequency and reflecting light of other frequencies; and the second reflection means, with respect to the predetermined integer n of 1 or more, transmitting (n+1)th sidebands and reflecting other light. This enables a reciprocating optical modulation system to be readily configured using a filter that is transparent to a portion of the light to form an optical resonator.

The system can be configured with a laser light source, the first reflection means comprising a narrow-bandpass filter, an optical modulator, and the second reflection means comprising a band-limiting filter, reducing the cost. Another arrangement in which the first reflection means comprises, a narrow-bandpass filter, and the second reflection means comprises an optical modulator, facilitates the modulation of optical signals.

The reciprocating optical modulation system also includes one having means for converting part of the optical output into electrical signals, and means for re-applying the electrical signals to the modulation signal of the phase modulator, which makes it possible to readily obtain a stable optical signal. In another arrangement that enables the system to multiply high-frequency signals, the system also includes means that uses a nonlinear element for combining a portion of the light input to the system with sideband signals output from the system, and means for extracting electrical signals of a predetermined frequency band from the signals thus combined.

What is claimed is:

1. A reciprocating optical modulation system comprising:
   means for, taking n as a predetermined integer of 1 or more, modulating light of a predetermined frequency to produce an nth order sideband group thereof;
   means for modulating said nth order sideband group to produce an (n+1)th order sideband group; and
   means for selecting at least part of said (n+1)th order sideband group.

2. An optical modulation system according to claim 1, wherein said system includes a light path that is folded by reflection means.

3. An optical modulation system according to claim 2, wherein said system includes a plurality of means for modulating, to which at least one of a group of sidebands of different orders is input.

4. An optical modulation system according to claim 3, wherein said system includes:
   first means for reflecting that passes light of said predetermined frequency prior to modulation and reflects light of other frequencies; and
   second means for reflecting that, with respect to the predetermined integer n of 1 or more, passes (n+1)th sidebands and reflects other light.

5. An optical modulation system according to claim 4, wherein:
   said system further includes a laser light source and an optical modulator,
   said first means for reflecting is comprised of a narrow-bandpass filter that passes light of said predetermined frequency prior to modulation and reflects light of other frequencies, and
   said second means for reflecting is comprised of a band-limiting filter that, with respect to the predetermined integer n of 1 or more, passes (n+1)th sidebands and reflects other light.

6. An optical modulation system according to claim 4, wherein:
   said system further includes a laser light source, an optical modulator and a phase modulator,
   said first means for reflecting is comprised of a narrow-bandpass filter that passes light of said predetermined frequency prior to modulation and reflects light of other frequencies, and
   said second means for reflecting is comprised of a band-limiting filter that, with respect to the predetermined integer n of 1 or more, passes (n+1)th sidebands and reflects other light.

7. An optical modulation system according to claim 6, wherein said system further includes:
   means for converting part of an optical output from the system into an electrical signal, and
   means for re-inputting the electrical signal to a modulation signal of the phase modulator.

8. An optical modulation system according to claim 7, wherein said system includes:
  means for, using a nonlinear element, combining a portion of a light input to the system with sideband output from the system into combined signals, and
  means for extracting from the combined signals an electrical signal of a predetermined frequency band.

9. An optical modulation system according to claim 6, wherein said system includes:
  means for, using a nonlinear element, combining a portion-of a light input to the system with sideband output from the system into combined signals, and
  means for extracting from the combined signals an electrical signal of a predetermined frequency band.

10. An optical modulation system according to claim 4, wherein said system includes:
  means for, using a nonlinear element, combining a portion of a light input to the system with sideband output from the system into combined signals, and
  means for extracting from the combined signals an electrical signal of a predetermined frequency band.

11. An optical modulation system according to claim 3, wherein said system includes:
  means for, using a nonlinear element, combining a portion of a light input to the system with sideband output from the system into combined signals, and
  means for extracting from the combined signals an electrical signal of a predetermined frequency band.

12. An optical modulation system according to claim 2, wherein said system includes:
  means for, using a nonlinear element, combining a portion of a light input to the system with sideband output from the system into combined signals, and
  means for extracting from the combined signals an electrical signal of a predetermined frequency band.

13. An optical modulation system according to claim 1, wherein said system includes a plurality of means for modulating, to which at least one of a group of sidebands of different orders is input.

14. An optical modulation system according to claim 13, wherein said system includes:
  first means for reflecting that passes light of said predetermined frequency prior to modulation and reflects light of other frequencies; and
  second means for reflecting that, with respect to the predetermined integer n of 1 or more, passes (n+1)th sidebands and reflects other light.

15. An optical modulation system according to claim 14, wherein:
  said system further includes a laser light source and an optical modulator,
  said first means for reflecting is comprised of a narrow-bandpass filter that passes light of said predetermined frequency prior to modulation and reflects light of other frequencies, and
  said second means for reflecting is comprised of a band-limiting filter that, with respect to the predetermined integer n of 1 or more, passes (n+1)th sidebands and reflects other light.

16. An optical modulation system according to claim 15, wherein said system includes:
  means for, using a nonlinear element, combining a portion of a light input to the system with sideband output from the system into combined signals, and
  means for extracting from the combined signals an electrical signal of a predetermined frequency band.

17. An optical modulation system according to claim 14, wherein:
  said system further includes a laser light source, an optical modulator and a phase modulator,
  said first means for reflecting is comprised of a narrow-bandpass filter that passes light of said predetermined frequency prior to modulation and reflects light of other frequencies, and
  said second means for reflecting is comprised of a band-limiting filter that, with respect to the predetermined integer n of 1 or more, passes (n+1)th sidebands and reflects other light.

18. An optical modulation system according to claim 17, wherein said system further includes:
  means for converting part of an optical output from the system into an electrical signal, and
  means for re-inputting the electrical signal to a modulation signal of the phase modulator.

19. An optical modulation system according to claim 18, wherein said system includes:
  means for, using a nonlinear element, combining a portion of a light input to the system with sideband output from the system into combined signals, and
  means for extracting from the combined signals an electrical signal of a predetermined frequency band.

20. An optical modulation system according to claim 17, wherein said system includes:
  means for, using a nonlinear element, combining a portion of a light input to the system with sideband output from the system into combined signals, and
  means for extracting from the combined signals an electrical signal of a predetermined frequency band.

21. An optical modulation system according to claim 14, wherein said system includes:
  means for, using a nonlinear element, combining a portion of a light input to the system with sideband output from the system into combined signals, and
  means for extracting from the combined signals an electrical signal of a predetermined frequency band.

22. An optical modulation system according to claim 13, wherein said system includes:
  means for, using a nonlinear element, combining a portion of a light input to the system with sideband output from the system into combined signals, and
  means for extracting from the combined signals an electrical signal of a predetermined frequency band.

23. An optical modulation system according to claim 13, wherein said system includes:
  means for, using a nonlinear element, combining a portion of a light input to the system with sideband output from the system into combined signals, and
  means for extracting from the combined signals an electrical signal of a predetermined frequency band.

24. An optical modulation system according to claim 1, wherein said system includes:
  means for, using a nonlinear element, combining a portion of a light input to the system with sideband output from the system into combined signals, and
  means for extracting from the combined signals an electrical signal of a predetermined frequency band.

* * * * *